(12) United States Patent
Cheng et al.

(10) Patent No.: US 8,611,909 B2
(45) Date of Patent: *Dec. 17, 2013

(54) SERVICE PROVIDING APPARATUS, SERVICE CONSUMING APPARATUS, AND SERVICE TRANSMITTING METHOD

(75) Inventors: Yen-Chich Cheng, Taipei (TW); Chih-Hsun Chou, Tucheng (TW); Wen-Yao Chang, Zhonghe (TW)

(73) Assignee: Institute for Information Industry, Taipei (TW)

( * ) Notice: Subject to any disclaimer, the term of this patent is extended or adjusted under 35 U.S.C. 154(b) by 253 days.

This patent is subject to a terminal disclaimer.

(21) Appl. No.: 12/631,166

(22) Filed: Dec. 4, 2009

(65) Prior Publication Data

US 2011/0130147 A1  Jun. 2, 2011

(30) Foreign Application Priority Data

Nov. 27, 2009  (TW) ............................... 98140567 A

(51) Int. Cl.
*H04W 72/00* (2009.01)
*H04B 7/00* (2006.01)

(52) U.S. Cl.
USPC ........ 455/450; 455/452.2; 455/454; 455/464; 455/515

(58) Field of Classification Search
USPC .......... 370/235, 345, 359; 455/41.2, 522, 410
See application file for complete search history.

(56) References Cited

U.S. PATENT DOCUMENTS 6,801,543 B1  10/2004  Ployer
6,912,405 B2  6/2005  Hiramatsu et al.
2005/0020211 A1  1/2005  Takikita
2009/0073880 A1  3/2009  Park et al.
2011/0103395 A1*  5/2011  Ratnakar et al. .............. 370/412
2011/0105078 A1*  5/2011  Hapsari et al. ................ 455/410
2011/0237290 A1*  9/2011  Nishikawa et al. ........... 455/522

FOREIGN PATENT DOCUMENTS

JP  2009-200970 A  9/2009

OTHER PUBLICATIONS

Office Action rendered by the German Patent and Trademark Office (GPTO) to the German counterpart patent application to the instant US application, Sep. 22, 2010, 16 pages including translation.
Office Action rendered by the Taiwan Intellectual Property Office for the Taiwan counterpart patent application to the instant US application, Dec. 25, 2012, 8 pages.

* cited by examiner

*Primary Examiner* — Nizar Sivji
(74) *Attorney, Agent, or Firm* — Skaar Ulbrich Macari, P.A.

(57) ABSTRACT

A service providing apparatus, a service consuming apparatus, and a service transmitting method are provided. The service providing apparatus is adapted to connect with the service consuming apparatus via a wireless network. Within a control channel period, the service providing apparatus schedules the services with the service consuming apparatus. Within a service channel period, the service providing apparatus provides a service resource to the service consuming apparatus according to the result of scheduling the services. If the service consuming apparatus does not send a service request signal to the service providing apparatus within the control channel period, the service consuming apparatus has to remain silent within the service control channel. By the arrangement, the problems caused from the characteristic of the link asymmetry of the wireless network can be solved.

5 Claims, 11 Drawing Sheets

SERVICE PROVIDING APPARATUS, SERVICE CONSUMING APPARATUS, AND SERVICE TRANSMITTING METHOD

PRIORITY

This application claims priority to Taiwan Patent Application No. 098140567 filed on Nov. 27, 2009, the disclosure of which is incorporated by reference herein in its entirety.

FIELD

The present invention relates to a service providing apparatus, a service consuming apparatus, and a service transmitting method. More particularly, the present invention relates to a service providing apparatus, a service consuming apparatus, and a service transmitting method for dividing a connection period into a control channel period and a service channel period for use to schedule and arrange service resources respectively.

BACKGROUND

Owing to advantages of wireless networks such as convenience in use, low deployment cost and high mobility, various wireless network standards have been developed rapidly in the modern network technologies. Although communication protocols of these wireless network standards vary greatly from each other, most of the wireless network standards have similar service architecture. Specifically, the service architecture of many wireless networks includes a service providing apparatus and a service consuming apparatus, in which network service resources are provided by the service providing apparatus to the service consuming apparatus. For instance, in a Vehicle-to-Roadside communication system of the telematics field, services are provided by a road side unit (RSU) to an on-board unit (OBU). In this kind of service architecture, the service providing apparatus has larger communication coverage while the service consuming apparatus has smaller communication coverage, which characteristic is known as the link asymmetry. The link asymmetry characteristic leads to a number of problems.

Now, the problems of a conventional wireless network caused by the link asymmetry will be explained with reference to a wireless network application scenario illustrated in FIGS. 1A, 1B and 1C. A wireless network 10a illustrated in FIG. 1A comprises a service providing apparatus 11a and a service consuming apparatus 13a. More specifically, in the scenario illustrated in FIG. 1A, communication coverage of the service providing apparatus 11a covers the service consuming apparatus 13a, so signals transmitted by the service providing apparatus 11a can be received by the service consuming apparatus 13a. However, communication coverage 130a of the service consuming apparatus 13a does not cover the service providing apparatus 11a, so a response signal to be transmitted by the service consuming apparatus 13a to the service providing apparatus 11a will fail to be transmitted correctly to the service providing apparatus 11a. Consequently, it is impossible for the service providing apparatus 11a and the service consuming apparatus 13a to perform a handshake process with each other to establish a connection therebetween. This causes repeated transmission of the response signal by the service consuming apparatus 13a, which unnecessarily occupies the network bandwidth. This is the first problem caused by the link asymmetry.

Secondly, referring to FIG. 1B, a wireless network 10b illustrated therein comprises a service providing apparatus 11b, a first service consuming apparatus 13b and a second service consuming apparatus 15b. Particularly, when the first service consuming apparatus 13b and the second service consuming apparatus 15b are not covered by each other's communication coverage 130b, 150b, it means that they cannot confirm each other's presence in the network. Consequently, the first service consuming apparatus 13b and the second service consuming apparatus 15b may send service requests to the service providing apparatus 11b simultaneously without coordinating with each other. This causes the service request signals transmitted to the service providing apparatus 11b to generate serious interference, thereby increasing the loading of the service providing apparatus 11b. This is the second problem caused by the link asymmetry.

Next, the second problem caused by the link asymmetry will be further explained with reference to FIG. 1C. FIG. 1C is a schematic view illustrating a connection period 16 used by the wireless network 10b. The connection period 16 is divided into two kinds of sections, i.e., control channel periods 164, 168 and service channel periods 162, 166. Within the control channel period 164, the service providing apparatus 11b broadcasts service providing signals 180a, 180b. Upon receiving the service providing signals 180a, 180b, the service consuming apparatuses 13b, 15b transmit data within the service channel period 166; more specifically, the service consuming apparatus 13b transmits data 190a, and the service consuming apparatus 15b transmits data 190b. However, the time intervals within which the data 190a, 190b are transmitted are partially overlapped with each other, which leads to the so-called collision.

Referring further to FIG. 1D, a wireless network 10c illustrated therein comprises a service providing apparatus 11c, a first service consuming apparatus 13c and a second service consuming apparatus 15c. The third problem caused by the link asymmetry is that, signals of the second service consuming apparatus 15c will cause communication interference between the first service consuming apparatus 13c and the service consuming apparatus 11c. Specifically, because the second service consuming apparatus 15c is located within communication coverage 110c of the service providing apparatus 11c, the second service consuming apparatus 15c will be able to receive signals transmitted by the service providing apparatus 11c and transmit a response signal accordingly. However, as described above, because the communication coverage 150c of the second service consuming apparatus 15c does not cover the service providing apparatus 11c, the second service consuming apparatus 15c will transmit the response signal continuously. In this case, the second service consuming apparatus 15c will cause interference to the first service consuming apparatus 13c that is currently conducting service transmissions with the service providing apparatus 11c. In other words, because the communication coverage 150c of the second service consuming apparatus 15c also covers the first service consuming apparatus 13c, continuous transmission of the request signal by the second service consuming apparatus 15c when it receives no response from the service providing apparatus 11c will cause communication interference to the first service consuming apparatus 13c.

Accordingly, there remains a need in the art to provide a solution that can overcome the drawbacks of the prior art so as to make data transmissions between the service providing apparatus and the service consuming apparatus more stable and efficient in various wireless networks.

SUMMARY

In order to address the aforesaid problems caused by the link asymmetry of wireless networks, the objective of certain embodiments of the present invention is to provide a service providing apparatus, a service consuming apparatus, a service transmitting method and computer-readable medium thereof, which firstly synchronize individual nodes of the wireless network in time and then divide a connection period into a control channel period and a service channel period. According to certain embodiments of the present invention, request, scheduling and arrangement of the service resources are conducted within the control channel period, and then the service resources are provided within the service channel period according to a result of the service resource scheduling and arrangement. Thereby, the present invention allows for more efficient use of the bandwidth and resources of the wireless network.

To accomplish the aforesaid objective, certain embodiments of the present invention provides a service transmitting method for a service providing apparatus. The service providing apparatus is adapted to connect to a service consuming apparatus via a wireless network. The service transmitting method according to one example embodiment comprises the steps of: (a) enabling the service providing apparatus to receive a service request signal from the service consuming apparatus within a control channel period, wherein the service request signal includes a service request of the service consuming apparatus; (b) enabling the service providing apparatus to decide a service schedule for the service consuming apparatus according to the service request; and (c) enabling the service providing apparatus to transmit a service paging signal within a service channel period according to the service schedule so that, the service consuming apparatus can access a service resource indicated by the service paging signal.

To accomplish the aforesaid objective, certain embodiments of the present invention also provide a computer-readable medium which stores a computer program. When the computer program is loaded into the service providing apparatus, the aforesaid service transmitting method will be implemented.

To accomplish the aforesaid objective, certain embodiments of the present invention further provide a service providing apparatus adapted to connect to a service consuming apparatus via a wireless network. The service providing apparatus comprises a transmitting module, a receiving module and a service module. The receiving module is configured to receive a service request signal from the service consuming apparatus within a control channel period, wherein the service request signal includes a service request of the service consuming apparatus. The service module is configured to decide a service schedule for the service consuming apparatus according to the service request. The transmitting module is configured to transmit a service paging signal within a service channel period according to the service schedule so that the service consuming apparatus can access a service resource indicated by the service paging signal.

To accomplish the aforesaid objective, certain embodiments of the present invention further provides a service transmitting method for a service consuming apparatus. The service consuming apparatus is adapted to connect to a service providing apparatus via a wireless network. The service transmitting method according to one example embodiment comprises the steps of: (a) enabling the service consuming apparatus to transmit a service request signal to the service providing apparatus within a control channel period, wherein the service request signal includes a service request of the service consuming apparatus; (b) enabling the service consuming apparatus to, after the step (a), receive a service paging signal from the service providing apparatus within a service channel period, wherein the service paging signal indicates a service resource that can be accessed by the service consuming apparatus.

To accomplish the aforesaid objective, certain embodiments of the present invention also provide a computer-readable medium which stores a computer program. When the computer program is loaded into the service consuming apparatus, the aforesaid service transmitting method will be implemented.

To accomplish the aforesaid objective, certain embodiments of the present invention further provides a service consuming apparatus adapted to connect to a service providing apparatus via a wireless network. The service consuming apparatus comprises a receiving module and a transmitting module. The transmitting module is configured to transmit a service request signal to the service providing apparatus within a control channel period, wherein the service request signal includes a service request of the service consuming apparatus. The receiving module is configured to receive a service paging signal from the service providing apparatus within a service channel period, wherein the service paging signal indicates a service resource that can be accessed by the service consuming apparatus.

According to certain embodiments of the present invention, a time synchronization process is firstly performed between the service providing apparatus and the service consuming apparatuses, then service resources are adjusted and allocated within the control channel period according to the service requests from the service consuming apparatuses, and next within the service channel period, service resources are provided by the service providing apparatus in sequence to the service consuming apparatuses requesting the services according to the arrangement and allocation. Thereby, waste of network bandwidth is reduced so that more efficient use can be made of network resources in the wireless networks.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

Figure 1A:
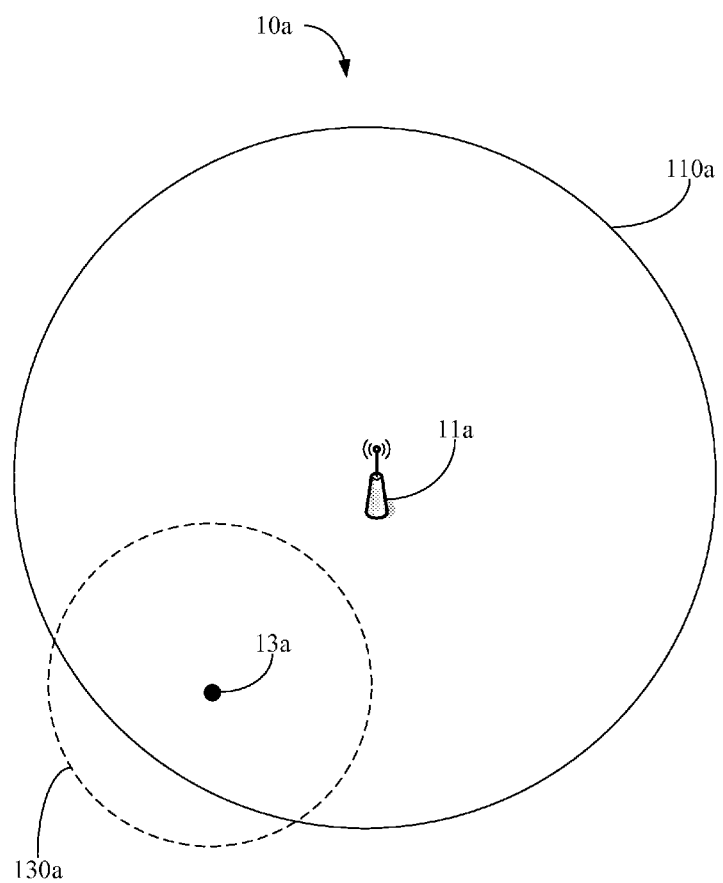
FIGS. 1A-1D are schematic views of the prior art.
Figure 1B:
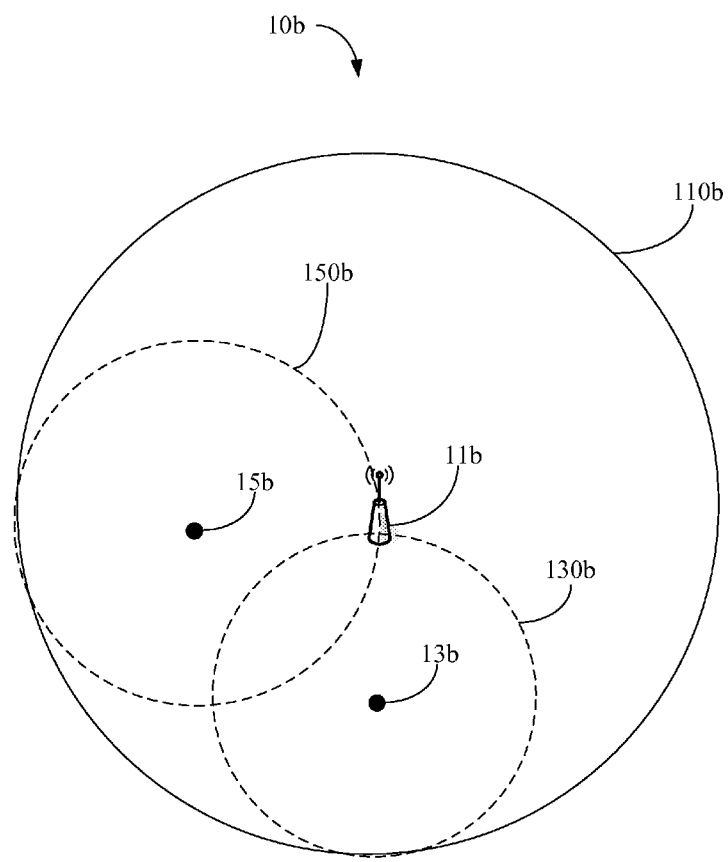
Figure 1C:
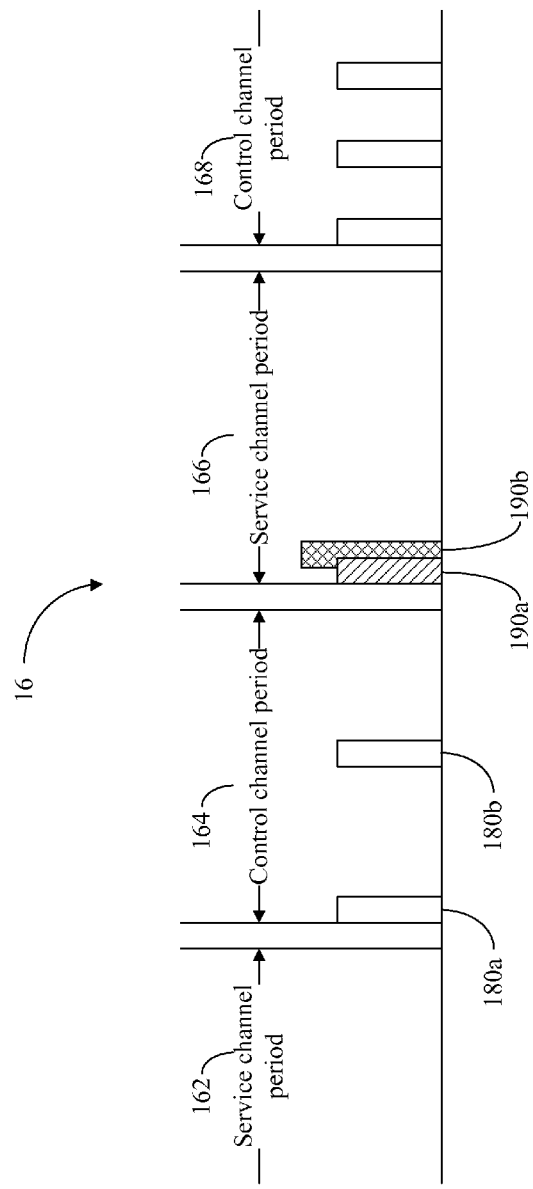
Figure 1D:
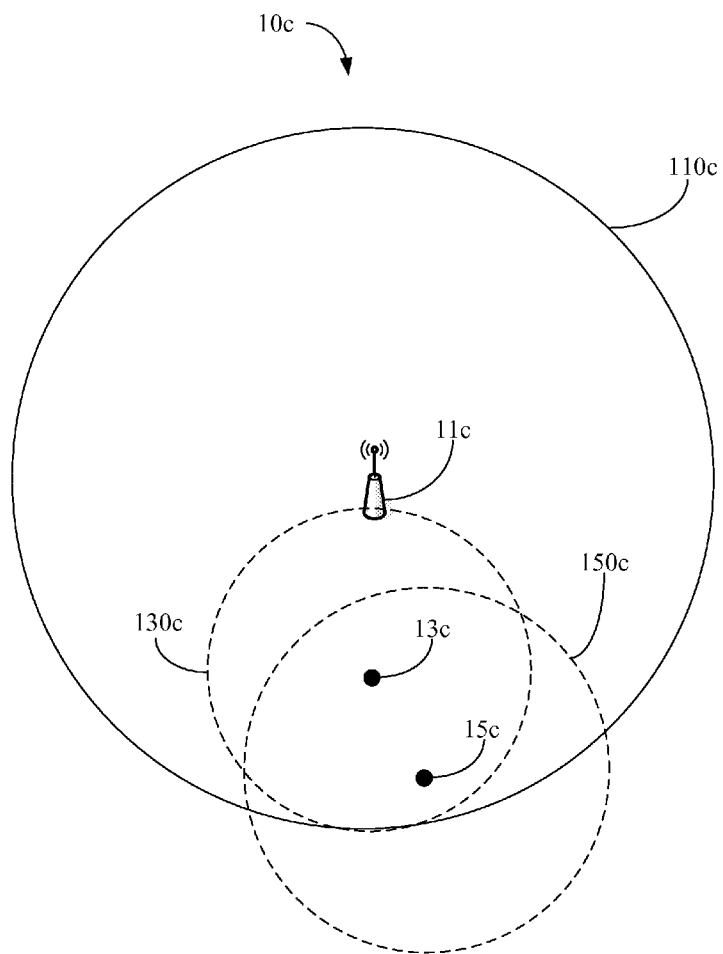

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the spirit and scope of the invention as defined by the appended claims.

DETAILED DESCRIPTION

In the following description, the service providing apparatus, the service consuming apparatus, the service transmitting method, and the computer-readable medium thereof according to certain embodiments of the present invention will be explained with reference to example embodiments thereof. It shall be appreciated that, the described embodiments are not intended to limit the present invention to any specific environment, applications or particular implementations. Therefore, description of these embodiments is only for purpose of illustration rather than to limit the present invention.

Figure 2A:
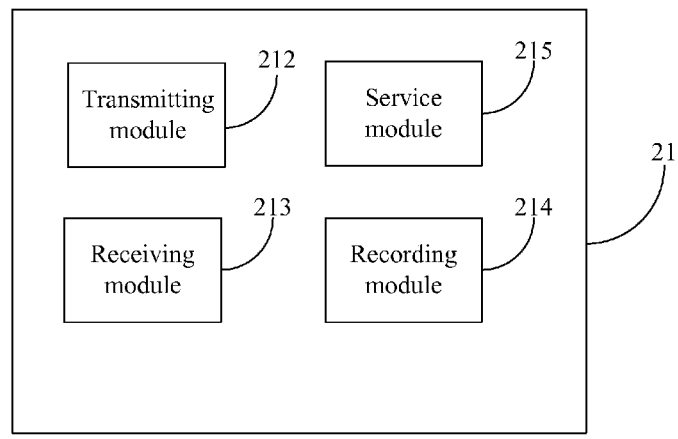
FIG. 2A is a schematic view of a service providing apparatus of a first embodiment.
Figure 2B:
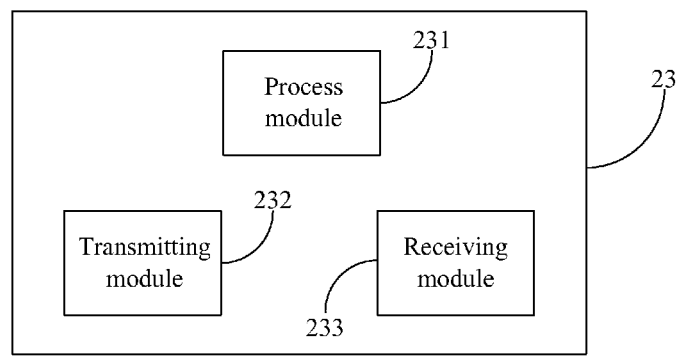
FIG. 2B is a schematic view of a service consuming apparatus of the first embodiment.

Referring to FIGS. 2A and 2B, a schematic view of a service providing apparatus 21 and a schematic view of a service consuming apparatus 23 according to a first example embodiment of the present invention are illustrated therein respectively. The service providing apparatus 21 comprises a transmitting module 212, a receiving module 213, a recording module 214 and a service module 215. The service consuming apparatus 23 comprises a process module 231, a transmitting module 232 and a receiving module 233. Functions and interactions of the individual modules of the service providing apparatus 21 and service consuming apparatus 23 will be detailed hereinafter.

Figure 3A:
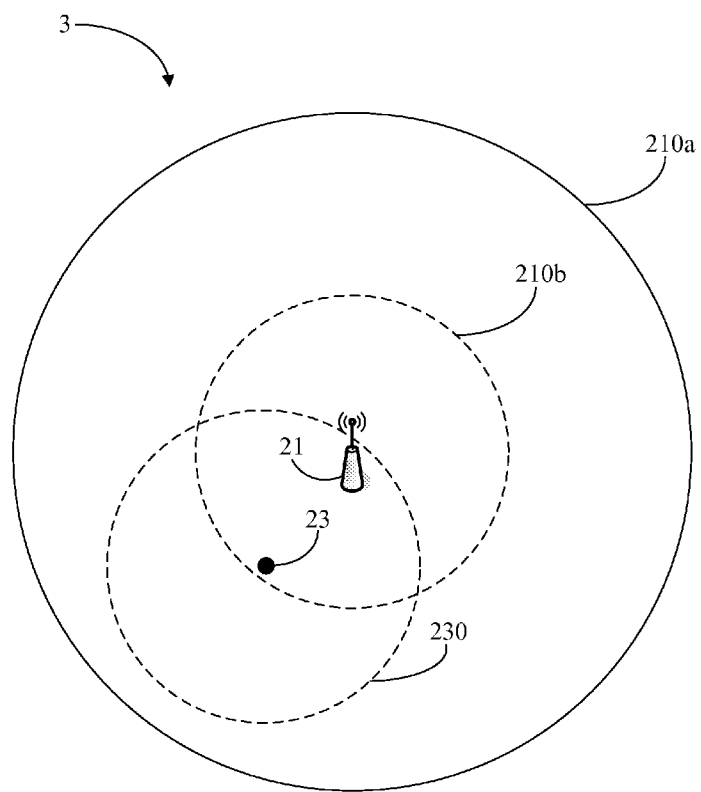
FIG. 3A is a schematic view of the first embodiment.
Figure 3B:
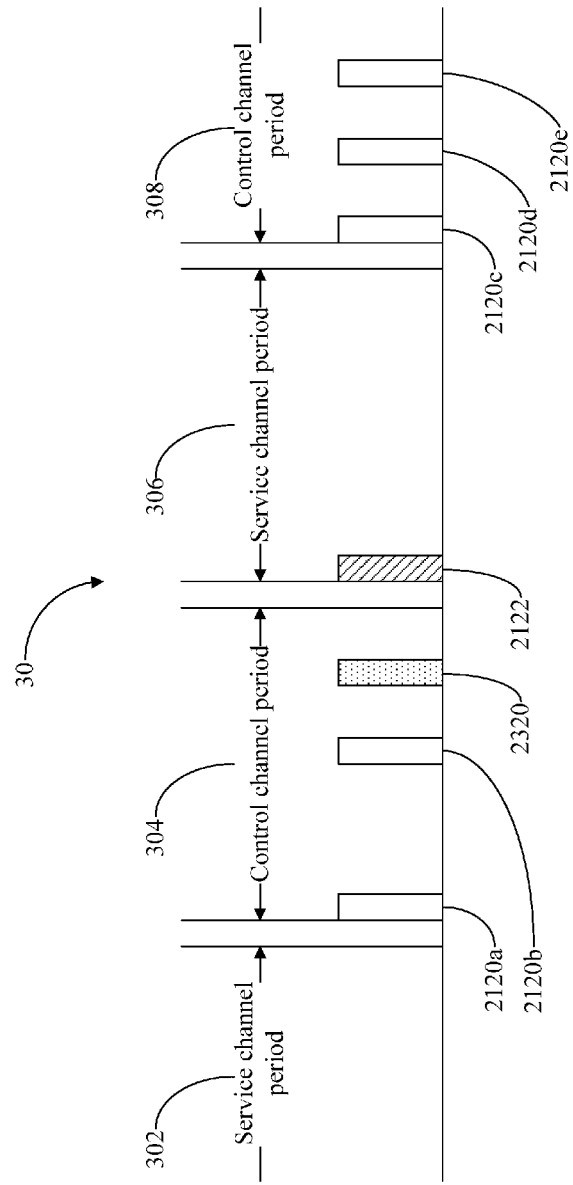
FIG. 3B is a schematic view of a connection channel of the first embodiment.

Referring to FIGS. 3A and 3B at the same time, FIG. 3A is a schematic view of a wireless network 3 according to the first example embodiment of the present invention. The service providing apparatus 21 connects to the service consuming apparatus 23 via the wireless network 3. As can be seen from FIG. 3A, communication coverage 210a of the service providing apparatus 21 is larger than communication coverage 230 of the service consuming apparatus 23, so link asymmetry exists in the wireless network 3. FIG. 3B is a schematic view of a connection period 30 used in the wireless network 3. The connection period 30 is divided into two kinds of sections, namely, control channel periods 304, 308 and service channel periods 302, 306. In this embodiment, the control channel periods 304, 308 and service channel periods 302, 306 appear alternately in the connection period 30.

When communication is to be carried out between the service consuming apparatus 23 and the service providing apparatus 21, synchronization must be made to ensure that the service providing apparatus 21 and the service consuming apparatus 23 are both within the connection period 30. For example, service providing signals 2120a, 2120b, 2120c, 2120d, 2120e transmitted by the service providing apparatus 21 in the control channel periods 304, 308 may be used for synchronization purpose. After the service consuming apparatus 23 located within the communication coverage 210a of the service providing apparatus 21 receives at least one of the service providing signals 2120a~2120e, synchronization with the service providing apparatus 21 can be made according to the at least one service providing signals. Once the synchronization is made, when the service providing apparatus 21 is in a control channel period, the service consuming apparatus 23 will also be in a control channel period; and when the service providing apparatus 21 is in a service channel period, the service consuming apparatus 23 will also be in a service channel period. How the service providing apparatus 21 and the service consuming apparatus 23 are synchronized is well known to those of ordinary skill in the art and, thus, will not be further described herein.

How the service providing apparatus 21 and the service consuming apparatus 23 are synchronized is accomplished will be assumed in the following example description that the synchronization operation has been completed between the service providing apparatus 21 and the service consuming apparatus 23. Presume that now it is in the control channel period 304. Within the control channel period 304, the transmitting module 212 of the service providing apparatus 21 broadcasts the service providing signals 2120a, 2120b. Also, it is presumed that the service consuming apparatus 23 is located within the communication coverage 210a of the service providing apparatus 21 when the service providing signal 2120b is transmitted by the service providing apparatus 21, so the service providing signal 2120b will be transmitted to the service consuming apparatus 23. Then, the service providing signal 2120b is received by the receiving module 233 of the service consuming apparatus 23. The service providing signals 2120 transmitted by the service providing apparatus 21 in the control channel period 304 is used to inform the service consuming apparatus 23 of what network resources are available for use.

After the receiving module 233 of the service consuming apparatus 23 has received the service providing signals 2120b within the control channel period 304, the service consuming apparatus 23 determines whether it needs to use network resources. If the service consuming apparatus 23 needs not to use any network resources, it will make no request. Otherwise, if the service consuming apparatus 23 needs to use network resources, the transmitting module 232 of the service consuming apparatus 23 will transmit a service request signal 2320 within the control channel period 304. The service request signal 2320 includes a service request (i.e., network resources needed by the service consuming apparatus 23) from the service consuming apparatus 23. As the service providing apparatus 21 is located within the communication coverage 230 of the service consuming apparatus 23, the service request signal 2320 will be transmitted to the service providing apparatus 21. Then, the service request signal 2320 is received by the receiving module 213 of the service providing apparatus 21 within the control channel period 304 so that the service providing apparatus 21 is formed of the service request of the service consuming apparatus 23.

After the receiving module 213 of the service providing apparatus 21 has received the service request signal 2320 transmitted by the service consuming apparatus 23, the recording module 214 of the service providing apparatus 21 records the service request included in the service request signal 2320 into a paging list. From the service request, the service providing apparatus 21 is informed what network resources are needed by the service consuming apparatus 23. On the other hand, the receiving module 213 of the service providing apparatus 21 also determines a signal strength of the service consuming apparatus 23 according to the service request signal 2320, and then determines communication coverage 230 of the service consuming apparatus 23 according to the signal strength, thereby knowing a transmission distance from the service consuming apparatus 23. Afterwards, the service module 215 of the service providing apparatus 21 can decide a service schedule for the service consuming apparatus 23 according to the service request recorded in the paging list.

Within the control channel period 304, the service consuming apparatus 23 transmits a service request, and the service providing apparatus 21 accomplishes the service scheduling according to the service request. In other words, the service providing apparatus 21 and the service consuming apparatus 23 accomplishes request for and arrangement of the network resources within the control channel period 304.

Subsequent to the control channel period 304, the service providing apparatus 21 and the service consuming apparatus 23 enter into the service channel period 306 synchronously. Within the service channel period 306, the transmitting module 212 of service providing apparatus 21 transmits a service paging signal 2122 to the service consuming apparatus 23 according to the service schedule. The service paging signal 2122 indicates network resources allowed to be accessed by the service consuming apparatus 23. On the other hand, within the service channel period 306, the receiving module 232 of the service consuming apparatus 23 receives the service paging signal 2122 so that the process module 231 can access the service resources.

More specifically, the transmitting module 212 will firstly generate the service paging signal 2122, and then provide service resources according to the service paging signal 2122 before transmitting the service paging signal 2122 to the service consuming apparatus 23. Correspondingly, the receiving module 233 of the service consuming apparatus 23 receives the service paging signal 2122 within the service channel period 306 and then accesses the service resources according to the service paging signal 2122. The service paging signal 2122 has a one-to-one correspondence relationship with the service consuming apparatus 23, hence, only the corresponding service consuming apparatus 23 can receive the service paging signal 2122 transmitted by the service providing apparatus 21 and access the service resources. Then, after the service resources provided by the service providing apparatus 21 have been used by the service consuming apparatus 23 within the service channel period 302, the recording module 214 of the service providing apparatus 21 will clear a content of the paging list before the next connection period arises so as to rearrange the network resources.

The control channel periods 304, 308 described above may be contention periods, and the service channel periods 302, 306 may be contention free periods. Within the control channel periods 304, 308 (i.e., the contention periods), the service consuming apparatus 23 has to contend against other service consuming apparatuses of the wireless network 3 for use of the registration service provided by the service providing apparatus 21. Within the service channel periods 302, 306 (i.e., the contention free periods), the service providing apparatus 21 will schedule the allocation of network resources; in this case, in order to access the service resources, the service consuming apparatus 23 only needs to wait for a service paging signal 2122 provided by the service providing apparatus 21 for its use without having to contend against other service consuming apparatuses for the service resources.

It shall be appreciated that, the service providing apparatus 21 described above is one preferred example of the present invention. In another example, the recording module is eliminated, in which case the service request included in the service request signal 2320 is not recorded into the paging list. In other examples, the receiving module of the service providing apparatus may not determine a signal strength of the service consuming apparatus 23 according to the service request signal 2320, in which case the service module of the service providing apparatus will only decide the service schedule for the service consuming apparatus 23 according to the service request included in the service request signal 2320.

Furthermore, the service providing apparatus 21 may be an RSU, and the service consuming apparatus 23 may be an OBU. When the service providing apparatus 21 is an RSU and the service consuming apparatus 23 is an OBU, the wireless network 3 is a Vehicle to Roadside communication network which adopts the WAVE (Wireless Access for Vehicular Environment) network technology and/or the DSRC (Dedicated Short Range Communication) network technology.

Figure 4A:
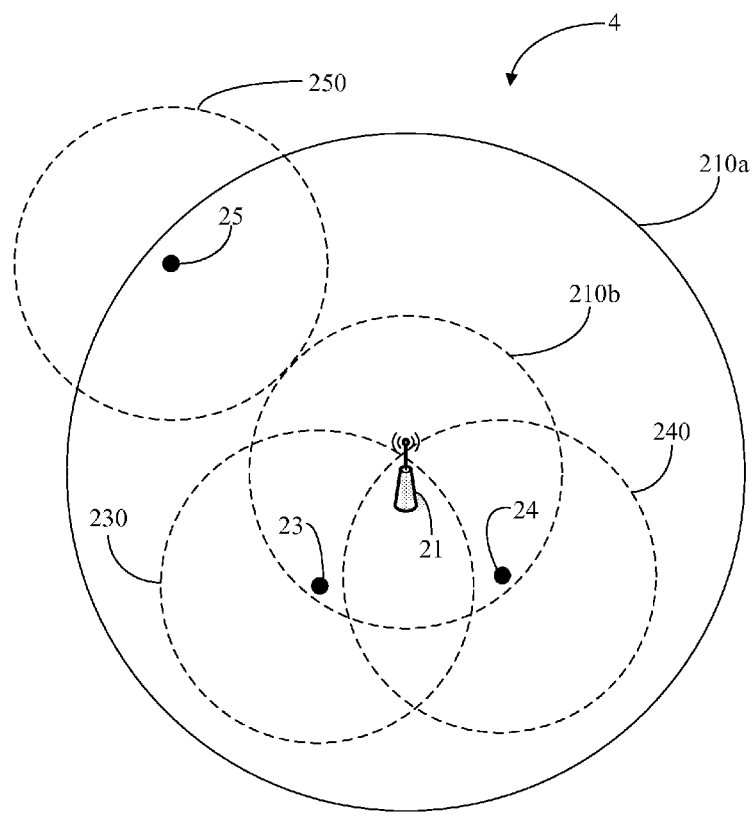
FIG. 4A is a schematic view of a second embodiment.
Figure 4B:
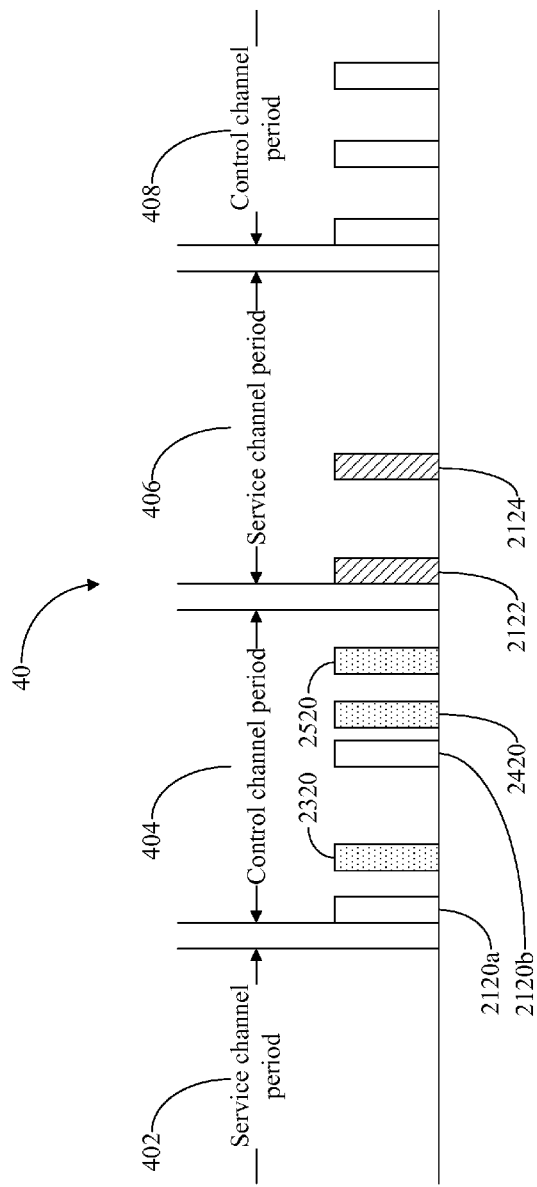
FIG. 4B is a schematic view of a connection channel of the second embodiment.

Reference will be made next to FIGS. 4A and 4B for the following discussion. FIG. 4A is a schematic view of a wireless network 4 according to a second example embodiment of the present invention, in which the service providing apparatus 21 connects to the service consuming apparatuses 23, 24, 25 via the wireless network 4. As can be seen from FIG. 4A, the communication coverage 210a of the service providing apparatus 21 is larger than communication coverage 230, 240, 250 of the service consuming apparatuses 23, 24, 25, so link asymmetry exists in the wireless network 4.

FIG. 4B is a schematic view of a connection period 40 used by the wireless network 4. The connection period 40 is divided into two kinds of periods, namely, the control channel periods 404, 408 and the service channel periods 402, 406. In this embodiment, the control channel periods 404, 408 and the service channel periods 402, 406 appear alternately in the connection period 40. Besides, hardware structures of the service providing apparatus 21 and the service consuming apparatuses 23, 24, 25 are all the same as those of the first embodiment and, thus, will not be further described herein. The following description will focus on communications between the service providing apparatus 21 and the service consuming apparatuses 23, 24, 25 after being synchronized.

Within the control channel period 404, the transmitting module 212 of the service providing apparatus 21 broadcasts service providing signals 2120a, 2120b. As the service consuming apparatuses 23, 24, 25 are located within the communication coverage 210a of the service providing apparatus 21, the service providing signals 2120a, 2120b will be transmitted to the service consuming apparatuses 23, 24, 25. The purpose of transmitting the signals 2120 is to inform the service consuming apparatuses 23, 24, 25 of what network resources are currently available. On the other hand, the respective receiving modules of the service consuming apparatuses 23, 24, 25 receive the service providing signals 2120a, 2120b within the control channel period 404 respectively.

Then, each of the service consuming apparatuses 23, 24, 25 determines whether it needs to use network resources. If the service consuming apparatuses 23, 24, 25 need not to use the network resources, they will make no request. Otherwise, if any of the service consuming apparatuses 23, 24, 25 needs to use the network resources, it has to make a request. Specifically, after the receiving module 233 of the service consuming apparatus 23 has received the service providing signal 2120a, the transmitting module 232 thereof transmits the service request signal 2320 to the service providing apparatus 21 within the control channel period 404; and after the respective receiving modules of the service consuming apparatus 24, 25 have received the service providing signal 2120b, the respective transmitting modules thereof transmit service request signals 2420, 2520 to the service providing apparatus 21 respectively within the control channel period 404. Each of the service request signals 2320, 2420, 2520 includes a service request of a respective one of the service consuming apparatuses 23, 24, 25. As the service providing apparatus 21 is located within the communication coverage 230, 240 of the service consuming apparatuses 23, 24, the service request signals 2320, 2420 will be received by the receiving module 213 of the service providing apparatus 21 within the control channel period 404. However, the communication coverage 250 of the service consuming apparatus 25 fails to cover the service providing apparatus 21, so the service request signal 2520 from the service consuming apparatus 25 cannot be received by the service providing apparatus 21. Therefore, the service providing apparatus 21 will not make arrangement for the service request of the service consuming apparatus 25.

After the service request signals 2320, 2420 have been received by the service providing apparatus 21, the recording module 214 records the service requests included in the service request signals 2320, 2420 into a paging list. According to the service requests included in the service request signals 2320, 2420, the service providing apparatus 21 is informed of network resources needed respectively by the service consuming apparatuses 23, 24. On the other hand, the receiving module 213 of the service providing apparatus 21 determines respective signal strengths of the service consuming apparatuses 23, 24 according to the service request signals 2320, 2420 and, then determines the respective communication coverage 230, 240 of the service consuming apparatuses 23, 24 according to the respective signal strengths, thereby recording transmission distances currently needed by the service consuming apparatuses 23, 24. Next, the service module 215 of the service providing apparatus 21 decides service schedules for the service consuming apparatuses 23, 24 according to the services resources and the respective communication coverage 230, 240 and decides a subsequent communication coverage 210b within which services are to be provided. The service providing apparatus 21 decides the subsequent communication coverage 210b in a dynamic way; i.e., it adjusts transmission power used for transmitting signals to the service consuming apparatuses 23, 24 in a dynamic way. In other examples, the service providing apparatus 21 may transmit subsequent signals within a fixed communication coverage (i.e., with fixed transmission power).

The service providing apparatus 21 and the service consuming apparatuses 23, 24, 25 accomplish request for and arrangement of the network resources within the control channel period 404. Since the service consuming apparatus 25 fails to connect to the service providing apparatus 21, the service providing apparatus 21 will not schedule services for the service consuming apparatus 25.

Subsequent to the control channel period 404, the service providing apparatus 21 and the service consuming apparatuses 23, 24, 25 enter into the service channel period 406. Within the service channel period 406, the transmitting module 212 of the service providing apparatus 21 transmits service paging signals 2122, 2124 to the service consuming apparatuses 23, 24 respectively within the communication coverage 210b according to the service schedule. The service paging signal 2122 transmitted to the service consuming apparatus 23 indicates a service resource available for use by the service consuming apparatus 23. Similarly, the service paging signal 2124 transmitted to the service consuming apparatus 24 indicates a service resource available for use by the service consuming apparatus 24. After the service paging signals 2122, 2124 are received by the respective receiving modules of the service consuming apparatuses 23, 24 respectively, the respective process modules of the service consuming apparatuses 23, 24 will access the respective service resources according to the service paging signals 2122, 2124 respectively.

More specifically, the transmitting module 212 will firstly generate service paging signals 2122, 2124, and then provide service resources according to the service paging signals 2122, 2124 before transmitting the service paging signals 2122, 2124 to the service consuming apparatus 23 and 24 respectively. Correspondingly, the respective receiving modules of the service consuming apparatuses 23, 24 receive the service paging signals 2122, 2124 and then access the service resources according to the service paging signals 2122, 2124.

Then, after the service resources provided by the service providing apparatus 21 have been used by the service consuming apparatuses 23, 24 in sequence within the service channel period 406, the recording module 214 of the service providing apparatus 21 will clear a content of the paging list before the next control channel period 408 arises so as to rearrange the network resources.

Similarly, the control channel periods 404, 408 described above may be contention periods, and the service channel periods 402, 406 may be contention free periods. Furthermore, the service providing apparatus 21 may be an RSU, and the service consuming apparatus 23 may be an OBU.

In addition to the aforesaid steps, the second example embodiment can also execute all the operations and functions set forth in the first embodiment. How the second embodiment executes these operations and functions will be readily appreciated by those of ordinary skill in the art based on the explanation of the first embodiment, and thus will not be further described herein.

Figure 5:
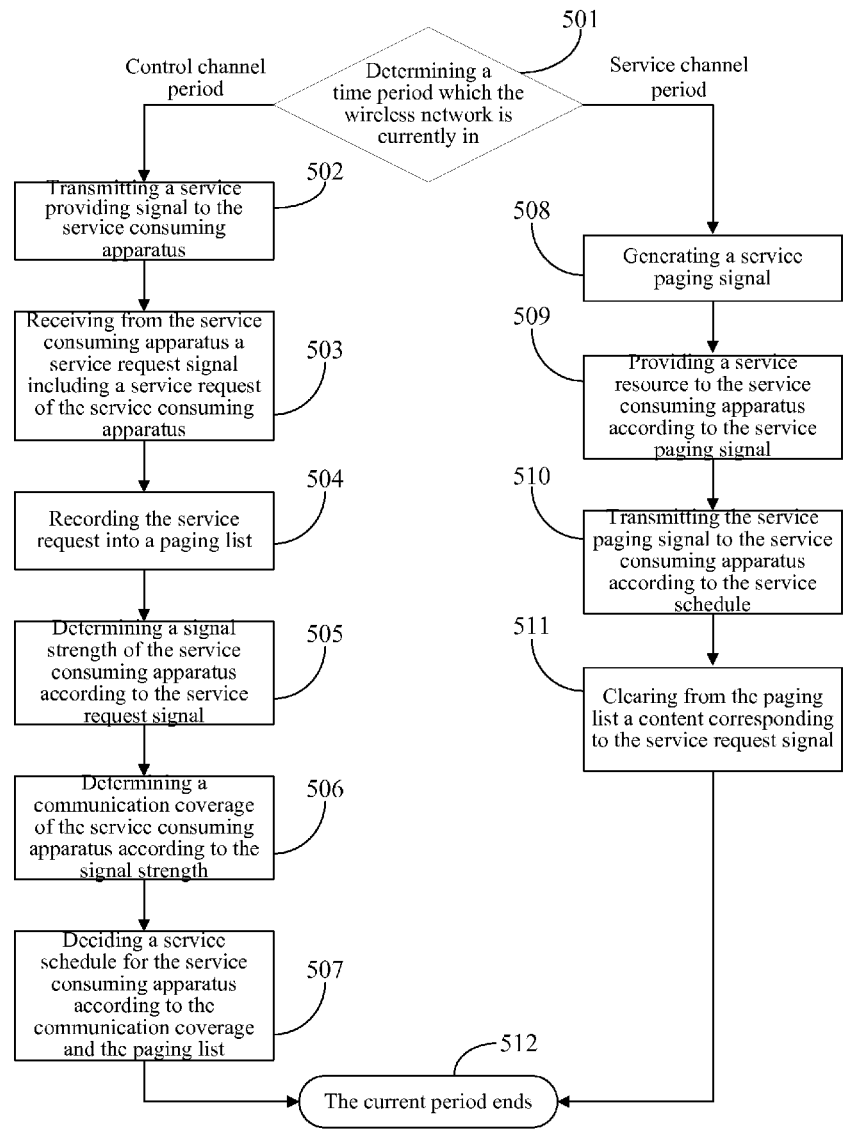
FIG. 5 is a flowchart of a service transmission method of a third embodiment.

A third example embodiment of certain embodiments of the present invention is a service transmitting method, a flowchart of which is shown in FIG. 5. The service transmitting method of the third example embodiment is for use in a service providing apparatus (e.g., the service providing apparatus 21 of the first embodiment), which connects to a service consuming apparatus via a wireless network (e.g., the service consuming apparatus 23 of the first embodiment). Steps of the service transmitting method of the third embodiment will be detailed as follows.

First of all, all service consuming apparatuses connecting to the service providing apparatus are synchronized to the service providing apparatus. After the synchronization, when the service providing apparatus is in a control channel period, the service consuming apparatuses connected thereto will also be in a control channel period; and when the service providing apparatus is in a service channel period, the service consuming apparatuses connected thereto will also be in a service channel period.

Firstly, step 501 is executed to enable the service providing apparatus to determine a time period which the wireless network is currently in, i.e., to determine whether the wireless network is currently in a control channel period or in a service channel period. For better understanding of the main technical features of the present invention, the following description will start from appearance of a control channel period. Next, step 502 is executed to enable the service providing apparatus to transmit a service providing signal to the service consuming apparatus connecting thereto. The purpose of step 502 is to inform the service consuming apparatus of what network resources are currently available for use. The service consuming apparatus receiving the service providing signal will determine whether there is any network resource it needs according to the service providing signal. If there isn't, no request will be made. Otherwise, if, after receiving the service providing signal, the service consuming apparatus finds that there is a network resource it needs, it will transmit a service request signal back to the service providing apparatus.

Subsequently, it is determined whether there is any service request signal transmitted to the service providing apparatus. Here, it is presumed that there is no service request signal transmitted to the service providing apparatus. Then, if the wireless network is still in the control channel period after a predetermined time interval, step 502 may be repeated by the service providing apparatus. If there is a service request signal transmitted to the service providing apparatus, then step 503 is executed to enable the service providing apparatus to receive the service request signal from the service consuming apparatus. The service request signal includes a service request of the service consuming apparatus. In other words, the service request is a request for services proposed by the service consuming apparatus to the service providing apparatus. Next, step 504 is executed to enable the service providing apparatus to, after receiving the service request signal, record the service request included therein into a paging list. From the service request, the service providing apparatus can be informed the network resources needed by the service consuming apparatus. Afterwards, step 505 is executed to enable the service providing apparatus to determine a signal strength of the service consuming apparatus according to the service request, and step 506 is executed to enable the service providing apparatus to determine communication coverage of the service consuming apparatus according to the signal strength so as to record a transmission distance needed by the service consuming apparatus.

Thereafter, step 507 is executed to decide a service schedule for the service consuming apparatus according to the communication coverage and the paging list. In more detail, the service providing apparatus may firstly determine a signal reception capability of the service consuming apparatus according to the communication coverage of the service consuming apparatus, and arrange network resource services to be used by the service consuming apparatus according to content of the paging list. Thereby, after the service schedule for the service consuming apparatus is decided, services can be provided to the service consuming apparatus according to the signal reception capability of the service consuming apparatus and the service schedule recorded in the paging list.

The service providing apparatus and the service consuming apparatus accomplish request for and arrangement of the network resources within the control channel period. Next, upon completion of the control channel period, the current period comes to an end 512. In this example embodiment, the next period is a service channel period.

In this example embodiment, in the next period, step 501 is firstly executed to determine a time period which the wireless network current is currently in. Then, step 508 is executed to generate a service paging signal. Next, step 509 is executed to provide a service resource to the service consuming apparatus according to the service paging signal. Afterwards, step 510 is executed to transmit the service paging signal to the service consuming apparatus according to the service schedule so that, after receiving the service paging signal, the service consuming apparatus can access the service resource. As the service paging signal has a one-to-one correspondence relationship with the service consuming apparatus, only the corresponding service consuming apparatus can make a response and access the service resources after the service paging signal is transmitted by the service providing apparatus.

Subsequently, step 511 is executed to, after the service resources provided by the service providing apparatus have been used by the service consuming apparatus within the service channel period, enable the service providing apparatus to clear a content of the paging list before the next connection period arises so as to reallocate the network resources. Upon completion of the service channel period, the current period comes to an end 512 and a next time period appears. In other words, the service providing apparatus will exit from the service channel period and enter into another control channel period.

In the example method described above, the control channel period may be a contention period, and the service channel period may be a contention free period. Furthermore, the service providing apparatus 21 may be an RSU, and the service consuming apparatus 23 may be an OBU.

In addition to the aforesaid steps, the third example embodiment can also execute all the operations and functions of the service providing apparatuses set forth in the first example embodiment and the second example embodiment. How the third embodiment executes these operations and functions will be readily appreciated by those of ordinary skill in the art based on the explanation of the service providing apparatuses of the first embodiment and the second embodiment, and thus will not be further described herein.

Figure 6:
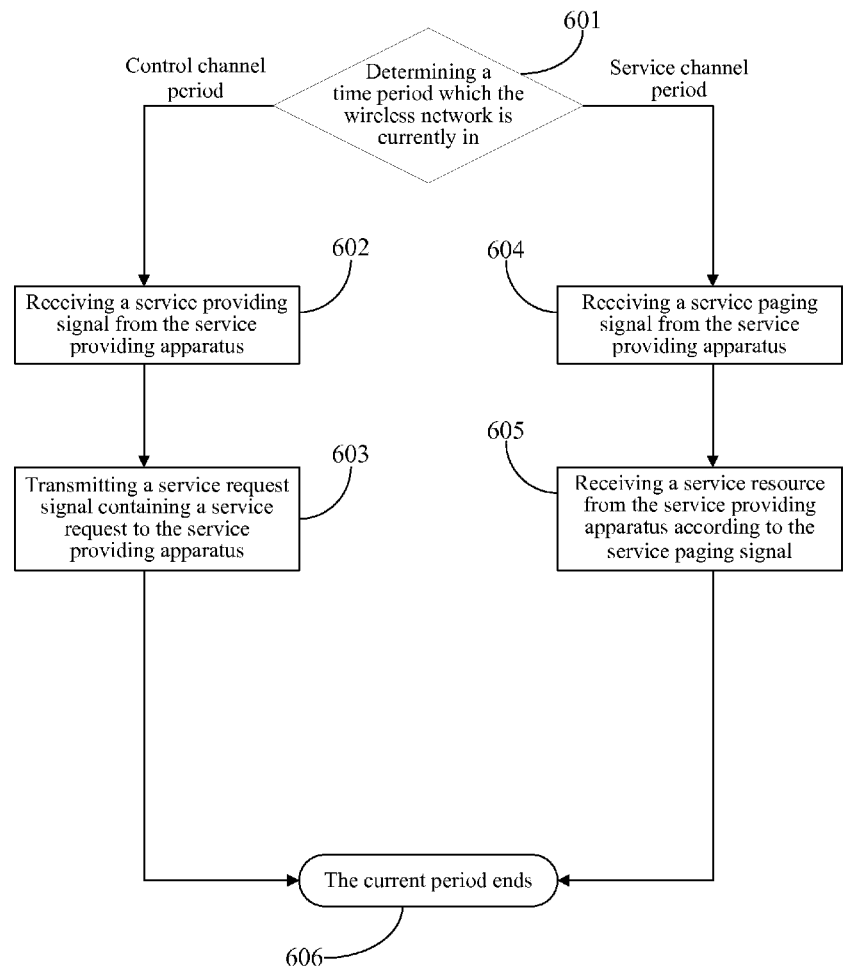
FIG. 6 is a flowchart of a service transmission method of a fourth embodiment.

A fourth example embodiment of the present invention is another service transmitting method, a flowchart of which is shown in FIG. 6. The service transmitting method of the fourth embodiment is for use in a service consuming apparatus (e.g., the service consuming apparatus 23 of the first embodiment), which connects to a service providing apparatus via a wireless network (e.g., the service providing apparatus 21 of the first embodiment). Steps of the service transmitting method of the fourth example embodiment will be detailed as follows.

Likewise, before step 601, the service consuming apparatus must perform the aforesaid synchronization process, which is similar to what described above and will not be described again herein. Then, step 601 is executed to enable the service consuming apparatus to determine a time period which the wireless network is currently in, i.e., to determine whether the wireless network is currently in a control channel period or in a service channel period. To aide understanding, the following description will start also from appearance of a control channel period.

Next, step 602 is executed to enable the service consuming apparatus to receive a service providing signal from the service providing apparatus. According to the service providing signal, the service consuming apparatus determines whether there is any network resource it needs. If there isn't, no request will be made. Otherwise, if, after receiving the service providing signal, the service consuming apparatus finds that there is a network resource it needs, step 603 is executed to enable the service consuming apparatus to transmit a service request signal, which includes a service request of the service consuming apparatus, to the service providing apparatus so as to request for services of the service providing apparatus.

Upon completion of the control channel period, the current period comes to an end 606 and a next time period (i.e., a service channel period) arises. Likewise, when the next period arises, step 601 is firstly executed to determine a time period which the wireless network current is currently in. Here, the current period is a service channel period, so step 604 is then executed to enable the service consuming apparatus to receive a service paging signal from the service providing apparatus. More specifically, after entering into the service channel period, the service consuming apparatus has to wait for a service paging signal from the service providing apparatus. If a service paging signal that may be used by the service consuming apparatus is received by the service consuming apparatus, it means that there is a network resource available for use; otherwise, if no service paging signal that may be used by the service consuming apparatus is received, it means that no network resource is allocated to the service consuming apparatus in the period this time.

If a service paging signal is received by the service consuming apparatus, then step 605 is executed to, according to the service paging signal, receive a service resource from the service providing apparatus and access the service resource. Likewise, as the service paging signal has a one-to-one correspondence relationship with the service consuming apparatus, only the corresponding service consuming apparatus can make a response and access the service resources after the service paging signal is transmitted by the service providing apparatus. Finally, upon completion of the service channel period, the current period comes to an end 606 and a next time period arises.

In the example method described above, the control channel period may also be a contention period, and the service channel period may also be a contention free period. Furthermore, the service providing apparatus 21 may be an RSU, and the service consuming apparatus 23 may be an OBU.

In addition to the aforesaid steps, the fourth example embodiment can also execute all the operations and functions of the service consuming apparatuses set forth in the first example embodiment and the second example embodiment. How the fourth embodiment executes these operations and functions will be readily appreciated by those of ordinary skill in the art based on the explanation of the service consuming apparatuses of the first embodiment and the second embodiment, and thus will not be further described herein.

A fifth example embodiment of the present invention is a computer-readable medium storing a computer program. A service providing apparatus is adapted to connect to a service consuming apparatus via a wireless network. When the computer program is loaded into the service providing apparatus and codes contained in the computer program are executed, the service transmitting method for a service providing apparatus described in the third embodiment can be accomplished. The tangible machine-readable medium may be a floppy disk, a hard disk, a compact disk (CD), a mobile disk, a magnetic tape, a database accessible to networks, or any other storage media with the same function and well known to those skilled in the art.

A sixth example embodiment of the present invention is a computer-readable medium storing a computer program. A service providing apparatus is adapted to connect to a service consuming apparatus via a wireless network. When the computer program is loaded into the service providing apparatus and codes contained in the computer program are executed, the service transmitting method for a service consuming apparatus described in the fourth embodiment can be accomplished. The tangible machine-readable medium may be a floppy disk, a hard disk, a compact disk (CD), a mobile disk, a magnetic tape, a database accessible to networks, or any other storage media with the same function and well known to those skilled in the art.

According to the above description, within the control channel period, the service providing apparatus adjusts and allocates service resources according to a service request of the service consuming apparatus. Then, within the service channel period, the service providing apparatus provides network resources to the service consuming apparatus according to the arrangement and allocation described above. Within the control channel period, the present invention preferentially chooses a service consuming apparatus that really has a service connection capability, and schedules the services in advance; and then within the following service channel period, the service resources are provided stably to the service consuming apparatus that needs the service resources according to the service schedule so that the service consuming apparatus can access the available service resources. On the other hand, if the service consuming apparatus does not transmit a service request signal to the service providing apparatus within the control channel period, it will be impossible for the service consuming apparatus to utilize the network resources of the service providing apparatus within the following service channel period. Thereby, network resources of the wireless network can be utilized more efficiently and the problems caused by the link asymmetry in the wireless network are addressed.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A service transmitting method for a service providing apparatus, the service providing apparatus being adapted to connect to a service consuming apparatus via a wireless network, the service transmitting method comprising the steps of:
    (a1) enabling the service providing apparatus to transmit a service providing signal to the service consuming apparatus within a control channel period;
    (a2) enabling the service providing apparatus to receive a service request signal from the service consuming apparatus within the control channel period after step (a1), wherein the service request signal includes a service request of the service consuming apparatus;
    (a3) enabling the service providing apparatus to record the service request into a paging list;
    (b1) enabling the service providing apparatus to determine a signal strength of the service consuming apparatus according to the service request signal;
    (b2) enabling the service providing apparatus to determine a communication coverage of the service consuming apparatus according to the signal strength;
    (b3) enabling the service providing apparatus to decide a service schedule for the service consuming apparatus according to the communication coverage and the service request recorded in the paging list;
    (c) enabling the service providing apparatus to transmit a service paging signal within a service channel period according to the service schedule so that the service consuming apparatus can access a service resource indicated by the service paging signal; and
    wherein the service providing apparatus is a roadside unit, the service consuming apparatus is a on-board unit, and the wireless network is a Vehicle Roadside communication network.

2. The service transmitting method as claimed in claim 1, wherein the step (c) comprises the steps of:
    (c1) enabling the service providing apparatus to generate the service paging signal according to the service schedule;
    (c2) enabling the service providing apparatus to provide the service resource according to the service paging signal; and
    (c3) enabling the service providing apparatus to transmit the service paging signal to the service consuming apparatus.

3. The service transmitting method as claimed in claim 1, wherein the control channel period is a contention period, and the service channel period is a contention free period.

4. A service providing apparatus, being adapted to connect to a service consuming apparatus via a wireless network, the service providing apparatus comprising:
    a transmitting module, being configured to transmit a service providing signal to the service consuming apparatus within a control channel period;

a receiving module, being configured to receive a service request signal from the service consuming apparatus within the control channel period after the service providing signal is transmitted by the transmitting module, to determine a signal strength of the service consuming apparatus according to the service request signal, and to determine communication coverage of the service consuming apparatus according to the signal strength, wherein the service request signal includes a service request of the service consuming apparatus;

a recording module, being configured to record the service request into a paging list; and a service module, being configured to decide a service schedule for the service consuming apparatus according to the communication coverage and the service request recorded in the paging list;

wherein the transmitting module is further configured to transmit a service paging signal within a service channel period according to the service schedule so that the service consuming apparatus can access a service resource indicated by the service paging signal; and wherein the service providing apparatus is a roadside unit, the service consuming apparatus is a on-board unit, and the wireless network is a Vehicle Roadside communication network.

5. The service providing apparatus as claimed in claim 4, wherein the transmitting module is further configured to provide the service resource according to the service paging signal, and the transmitting module is further configured to transmit the service paging signal to the service consuming apparatus.

* * * * *